F. ROLLAND & E. PILAIN.
BRAKE MECHANISM FOR VEHICLES.
APPLICATION FILED OCT. 13, 1911.
1,022,506.
Patented Apr. 9, 1912.
2 SHEETS—SHEET 1.
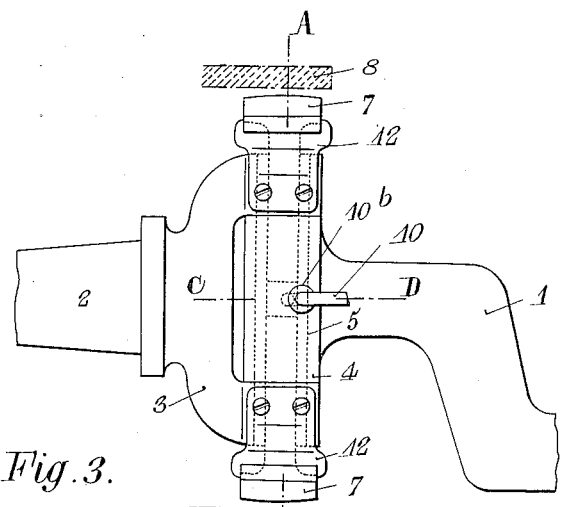
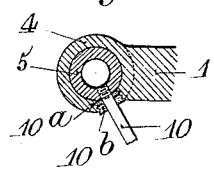
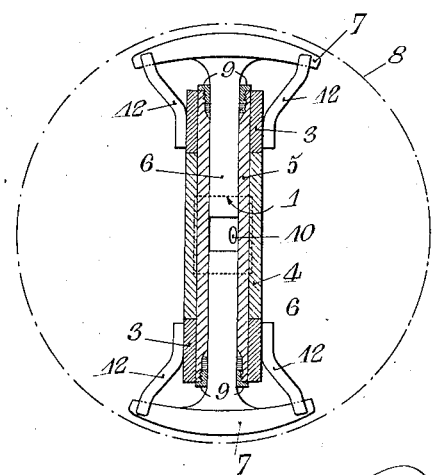
Witnesses:
Inventors:
François Rolland
and
Emile Pilain
by Singer Atty F. ROLLAND & E. PILAIN.
BRAKE MECHANISM FOR VEHICLES.
APPLICATION FILED OCT. 13, 1911.

1,022,506.

Patented Apr. 9, 1912.

2 SHEETS—SHEET 2.

UNITED STATES PATENT OFFICE.

FRANÇOIS ROLLAND AND EMILE PILAIN, OF TOURS, FRANCE.

BRAKE MECHANISM FOR VEHICLES.

1,022,506.  Specification of Letters Patent.  Patented Apr. 9, 1912.

Application filed October 13, 1911. Serial No. 654,519.

*To all whom it may concern:*

Be it known that we, FRANÇOIS ROLLAND and EMILE PILAIN, citizens of the Republic of France, and residents of Tours, France, have invented new and useful Improvements in or Relating to Brake Mechanism for Vehicles, of which the following is a specification.

This invention relates to a hydraulic brake intended to be applied to steering wheels of motor cars, and which is both simple and efficient.

A construction according to this invention is illustrated, by way of example, in the accompanying drawing, in which—

Figure 4:
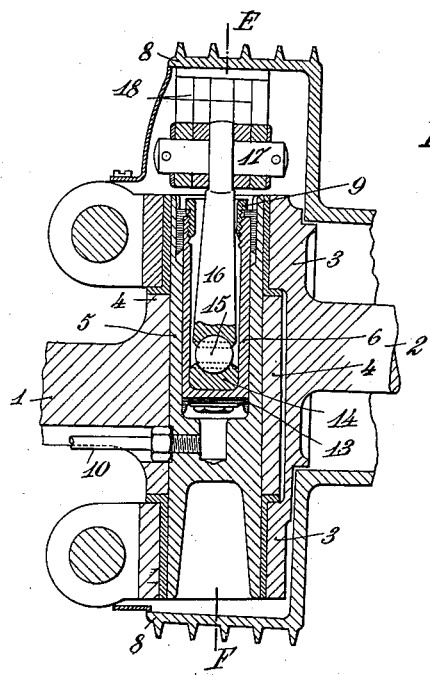
Figure 5:
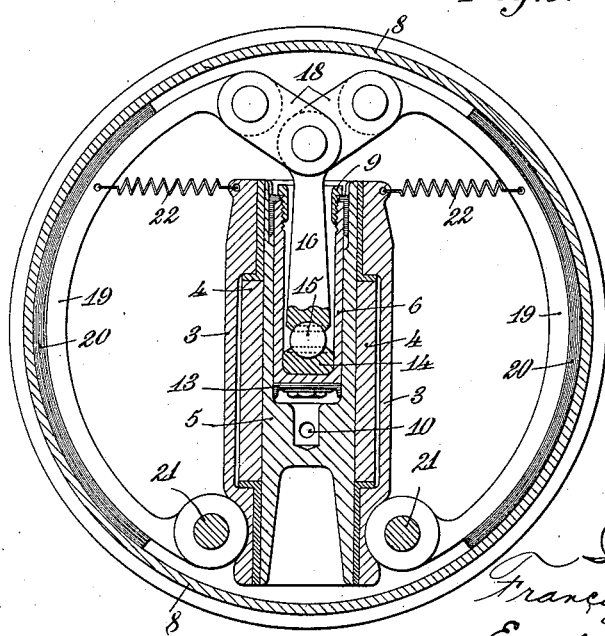

Figure 1 is a longitudinal elevation of one of the ends of a steering axle of a motor car. Fig. 2 is a cross-section on line A—B of Fig. 1. Fig. 3 a horizontal section on line C—D of Fig. 1. Fig. 4 is a sectional longitudinal elevation of one of the ends of the steering axle of a motor vehicle to which the improved construction of brake has been applied, and Fig. 5 is a cross-section on line E—F of Fig. 4.

In the said drawing (Figs. 1, 2 and 3), 1 is the steering or dead axle and 2 the journal or stud axle of the corresponding wheel. This journal is connected in the usual manner to the axle 1 by a shackle 3 in one piece with the same and pivoted about a pintle 5 passing through the socket 4 of the said axle 1. In the construction illustrated, the pintle 5 passing through the socket 4, is provided with a longitudinal bore. In the bore of the said pintle 5 are arranged inversely two rods 6 forming pistons and carrying each at their end outside the pintle 5, a slide block or brake shoe 7 of suitable curvature in order to enable it to engage with the interior of a guide or quadrant or device 8 carried by the wheel mounted on the journal 2. Packing 9 insuring a tight joint is provided at each of the ends of the pintle 5. A conduit 10 is connected to the pintle 5, and a tight joint of these two elements is insured by a leather washer 10ª tightened by means of a ring 10ᵇ screwed into the body of the sleeve 4. The conduit 10 is thus used to convey liquid under pressure to the bore of the pintle 5 in the space separating the pistons 6. In order that the slide blocks 7 should always have the same direction as that of the wheel mounted on the journal 2, and consequently of the guide 8, bifurcated parts 12 are provided at each end of the shackle 3, and the slide blocks 7 engage with the said bifurcated parts 12. It is obvious that a single bifurcated part 12 could be sufficient for each of the slide blocks 7, but the use of two of these parts arranged in a symmetrical manner, is preferable.

It will be readily understood that when the liquid under pressure is sent into the tube 10 by any suitable means, the two pistons 6 will be moved away from each other and will force in an energetic manner the slide blocks 7 against the interior of the guide 8, thus producing friction, and consequently the braking, of the corresponding wheel.

It is obvious that the construction described is repeated at the other end of the axle 1, only one end of which is shown. It must further be pointed out that, instead of a liquid under pressure, any other fluid such as air or gas under pressure for operating the brake could also be used. Further it must be pointed out that the tube 10 supplying fluid under pressure to the hollow spindle 5 could be screwed to the latter and provided with a shoulder in order to tighten a plastic washer between the said shoulder and a flattened portion provided on the said hollow pintle 5, thus insuring a tight joint.

The characteristic feature of the improved construction shown in Figs. 4 and 5 is that a single piston is sufficient for applying the two parts of the brake to the interior of the rim of the brake pulley or device mounted on the wheel, and that these two parts each offer a much greater friction surface, owing to which the wear of the brake shoes and the heating is much reduced, while at the same time the danger of leakage of the liquid used is reduced as the joints are reduced by half.

In Figs. 4 and 5, 1 is the steering or dead axle of the car, and 2 the journal or stud axle of the corresponding wheel. 3 is the shackle or bracket secured to the journal 2 and surrounding the ends of the socket 4 carried by the axle 1. The pintle 5 passing through the socket 4, contains merely one piston 6, so that it is no longer perforated throughout the whole of its length, as originally. The piston 6 is provided at the bottom with stamped out leathers 13 insuring a tight joint in the interior of the spindle 5 in which it is arranged and can slide in the longitudinal direction. Again, as before, a packing 9 is provided at the open end of the pintle 5 through which the piston 6 enters. The latter is recessed and contains at its bottom portion a step bearing 14 receiving a ball 15 on which rests the bottom end of suitable shape of a plunger rod 16 the upper end of which is provided with a trunnion 17 to which are pivoted connecting rods 18 arranged in pairs symmetrically relatively to the vertical axis of Fig. 5 of the drawing. These connecting rods 18 are pivoted to suitably curved brake bands or shoes 19 lined with sheets 20 made of copper or other material having a suitable coefficient of friction. These brake bands 19 are pivoted at their ends opposite their connection with rods 18, to pins 21 supported by the shackle or bracket of the journal of the wheel. The brake bands 19 are designed to frictionally engage the interior of the rim of pulley 8. Springs 22 connected on the one hand to the bracket 3, and on the other hand to the portions of the brake bands 19, at the end opposite to the spindles 21, have the tendency to keep the jaws 19 always away from the inner wall of the rim 8.

It will be readily understood that when by means of a conduit 10 screwed into the bore of the pintle 5, fluid under pressure is sent under the piston 6, the latter being driven upward, produces by means of its plunger rod 16 and connecting rods 18, the expansion of the jaws 19 and their energetic contact with the interior of the rim or device 8, the wheel thus being braked. As soon as the admission of fluid under pressure under the piston 6 ceases, the jaws 19 come nearer together under the action of the springs 22.

It will be readily understood that as the pintle 5 contains only one piston, the chances of leakage of the fluid under pressure are reduced to a minimum, and also that in view of the large size of the brake bands 19, the friction strains being distributed over large areas, the result will be that the wear of the plates 20 inserted between the jaws 19 and the rim 8 will be very slight.

Owing to the arrangement of the plunger rod 16 in the interior of the piston 6, any inaccuracy in fitting the jaws 19 would be of no importance because the plunger rod 16 will then always assume the suitable position in order that the thrust transmitted to it by the piston 6, should be suitably distributed on the connecting rods 18 and consequently on the jaws 19.

We claim:

1. In fluid pressure brakes for vehicles, the combination with a dead axle and a stud axle, and a wheel carried by said stud axle, of a pintle operatively connecting said dead axle and stud axle and having a longitudinal bore, a piston in the bore of said pintle, a device carried by the wheel having an internally formed peripheral face concentric with said stud axle, means for introducing fluid pressure into the said bore of said pintle for actuation of said piston, and mechanism adapted to frictionally engage the said face of said device responsive to actuation of said piston.

2. In fluid pressure brakes for vehicles, the combination with a dead axle and a stud axle, and a wheel carried by said stud axle, of a pintle operatively connecting said dead axle and stud axle and having a longitudinal bore, a piston in the said bore of said pintle, a device carried by the wheel having an internally formed peripheral face concentric with said stud axle, means for introducing fluid pressure into the said bore of said pintle for actuation of said piston, a brake shoe curved complementary to said face of said device and operatively connected to said piston to frictionally engage the said face responsive to action of said piston in one direction, and instrumentality for positioning said brake shoe with the curved portion thereof in operative relation to the said peripheral face of said device.

3. In fluid pressure brakes for vehicles, the combination with a dead axle and stud axle, and a wheel carried by said stud axle, of a pintle operatively connecting the said dead axle and stud axle and having a longitudinal bore, a piston in the said bore of said pintle, means for introducing fluid pressure into the said bore of said pintle for actuation of said piston, and mechanism actionable upon movement of said piston in one direction for braking said wheel.

4. In fluid pressure brakes, the combination of a dead axle, a pintle carried by said dead axle and having a longitudinal bore, a stud axle, a shackle carried by said stud axle and provided with sleeve portions movable about said pintle, a wheel carried by said stud axle, a piston in the said bore of said pintle, a device carried by said wheel having an internally formed peripheral face concentric with said stud axle, means for introducing fluid pressure to the said bore of said pintle for actuation of said piston, and mechanism adapted to frictionally engage the said face of said device responsive to actuation of said piston.

5. In fluid pressure brakes, the combination of a dead axle, a pintle carried by said dead axle and having a longitudinal bore, a stud axle, a shackle carried by said stud axle and provided with sleeve portions movable about said pintle, a wheel carried by said stud axle, a piston in the said bore of said pintle, means for introducing fluid pressure into the said bore of said pintle for actuation of said piston, and mechanism actionable upon movement of said piston in one direction for braking said wheel.

In testimony whereof we affix our signatures in presence of two witnesses.

FRANÇOIS ROLLAND.
EMILE PILAIN.

Witnesses:
H. C. COXE,
JULIEN CAVERNE.